Jan. 14, 1930.  R. BRADSHAW  1,743,592
SPRING TOOTH MOUNTING
Filed July 24, 1928

Inventor
Ray Bradshaw

By *Clarence A. O'Brien*
Attorney

Patented Jan. 14, 1930

1,743,592

UNITED STATES PATENT OFFICE

RAY BRADSHAW, OF CHARLES CITY, IOWA

SPRING-TOOTH MOUNTING

Application filed July 24, 1928. Serial No. 295,038.

This invention relates to improvements in digging implements and has reference more particularly to a novel mounting, whereby spring teeth may be attached to agricultural cultivators or plows, in lieu of the relatively broad shovels employed on these machines with the end in view of providing means whereby corn and other crops may be cultivated more efficiently in regions where quack grass is abundant. The main object of the invention is to provide a mounting that may be attached to the shovel shank of a multiple shovel type of cultivating plow, the same being of such construction as to permit the manufacture thereof at a reasonably low cost.

Among the remaining objects of the invention it is to be noted that the same is especially adapted for use in preparing the seed bed prior to the planting of the seed, in that the use of the machine equipped with the present invention will serve to successively abate the destructive growth of quack grass.

Figure 1:
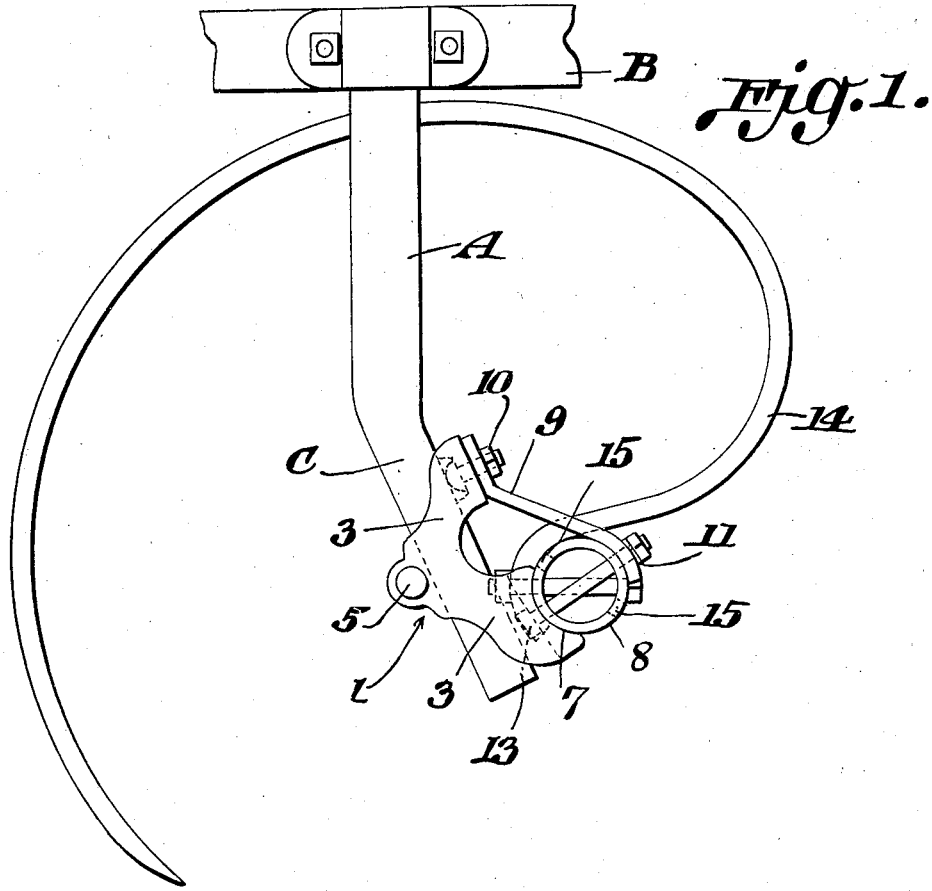
Figure 1 is a side elevation of the mounting shown attached to a shovel shank of a multiple shovel type of cultivator and illustrating the spring tooth properly arranged thereon.
Figure 3:
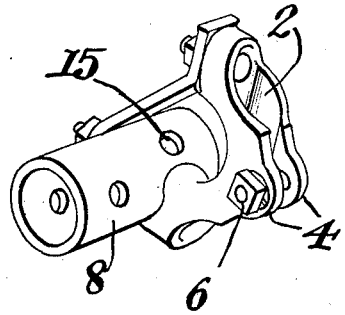
Figure 3 is a perspective view of the mounting.
Figure 2:
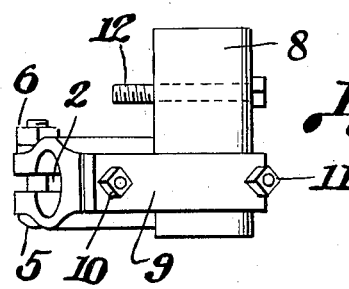
Figure 2 is a top plan view of the mounting shown detached from the double shank and with the spring tooth removed.

Referring to the drawings, wherein like numerals designate like parts, a shovel shank A of the type employed on multiple shovel type cultivators is shown in Figure 1 of the accompanying drawings attached at its upper end to the usual beam B. The lower end portion of the shank is usually reduced slightly and diverged slightly forwardly as designated by C.

The present invention includes in its novel mounting structure a substantially U-shaped body, generally referred to by numeral 1. A relatively large bore 2 is formed in the body, transversely through the leg portions 3—3. The bight portion of the body is bifurcated to provide furcations 4—4, each of which is formed with an opening in registry with each other, and through which a bolt 5 may extend and be provided with a nut 6. One leg portion of the body 1, at its free end is of greater bulk than the corresponding portion of its complementary leg and is formed at its extremity with an arcuate indenture 7. The indenture 7 is of a curvature preferably in conformity with the contour of a relatively short tube 8.

An elongated clamp plate 9 has one end portion diverged angularly and secured to the smaller leg of the body 1, by a suitable bolt and nut connection 10. The opposite end of the clamp plate 9 is bent in a manner to conform with the contour of the tube 8. This curved end portion of the plate 9 is adapted to bear against the side of the tube 8, opposite from the side thereof bearing against the curved portion 7 of the body 1. A bolt and nut connection 11 is employed for tightly securing the tube 8 between the clamp plate 9 and the body 1, in the manner clearly shown in Figure 1. It is preferable that the body 1 and the clamp plate 9 engage the tube 8 adjacent one end, so that the major portion of the tube will project at one side of the mounting. A bolt 12 is adapted to be arranged through the tube adjacent its projecting end, and a nut 13 is threadable on the bolt 12, for clamping one end of a spring tooth 14, securely to the tube, in the manner shown. The tooth 14 is of the usual conventional shape, the same being disposed upwardly toward the beam B, and then curved downwardly, rearwardly of the shank A to terminate below the lower end thereof. Registering openings 15—15 are formed through the tube 8 to permit the tube to be adjusted between the clamp plate 9 and body 1, as may be necessary in some instances.

Obviously, the reduced end C of the shank A is adapted to engage through the bore 2 of the body 1, after which the nut 6 is tightened on the bolt 5, for clamping the body tightly to the shank.

Having described the invention, what is claimed as new is:

1. In a spring tooth mounting of the character described, a relatively elongated body having a bifurcated portion wherein the usual shovel shank of a shovel type cultivator may be clamped, a plate attached at one end to the body adjacent one end thereof, a member clamped at one end between the opposite end of the plate and the said body, and an elongated spring tooth secured at one end to the projecting portion of the said member.

2. In a spring tooth mounting of the character described, a body having a bifurcated portion wherein the usual shovel shank of a shovel type cultivator may be clamped, a plate attached at one end to the body adjacent one end thereof and being curved at its opposite end, a cylindrical member adapted to be clamped at one end between the curved end of the blade and the said body, and an elongated spring tooth secured at one end to the projecting portion of the said cylindrical member.

3. In a spring tooth mounting of the character described, a substantially U-shaped body having its bight portion bifurcated to receive the usual shovel shank of a shovel type cultivator, means for clamping the shank within said bifurcation, a clamp plate secured at one end to one of the legs of the body and being curved at its opposite end, a cylindrical member clamped at one end between the curved end of the plate and the said body, and a spring tooth clamped at one end to the projecting portion of said cylindrical member.

In testimony whereof I affix my signature.
RAY BRADSHAW.